United States Patent
Thorp

(10) Patent No.: US 7,500,546 B2
(45) Date of Patent: Mar. 10, 2009

(54) BRAKE LINING CUP ATTACHMENT METHOD FOR REDUCED WEAR

(75) Inventor: John H. E. Thorp, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 11/900,117

(22) Filed: Sep. 10, 2007

(65) Prior Publication Data

US 2008/0060893 A1  Mar. 13, 2008

Related U.S. Application Data

(60) Provisional application No. 60/825,273, filed on Sep. 11, 2006.

(51) Int. Cl.
*F16D 13/60* (2006.01)

(52) U.S. Cl. .............. 188/218 XL; 188/250 G; 192/107 R

(58) Field of Classification Search .............. 188/73.32, 188/238–240, 250 B, 250 G, 218 XL; 192/107 C, 192; 107 T, 107 R
See application file for complete search history.

(56) References Cited

U.S. PATENT DOCUMENTS

| | | | | |
|---|---|---|---|---|
| 3,913,716 A | * | 10/1975 | Sedlock | 192/107 R |
| 3,920,108 A | * | 11/1975 | Ely | 192/107 R |
| 4,429,770 A | * | 2/1984 | Weisbrod | 188/73.32 |
| 4,903,814 A | * | 2/1990 | Tomotake et al. | 192/107 C |
| 5,178,235 A | * | 1/1993 | Montalvo et al. | 188/18 A |
| 5,558,186 A | * | 9/1996 | Hyde et al. | 188/218 XL |
| 5,709,288 A | * | 1/1998 | Riebe | 188/218 XL |
| 5,730,257 A | * | 3/1998 | Clark | 188/73.1 |
| 5,868,233 A | * | 2/1999 | Montalvo et al. | 192/107 R |
| 6,983,831 B2 | * | 1/2006 | Beri | 188/250 B |

\* cited by examiner

*Primary Examiner*—Christopher P Schwartz
(74) *Attorney, Agent, or Firm*—Snell & Wilmer L.L.P.

(57) ABSTRACT

A brake lining assembly having an annular carrier disk, and a plurality of segmented brake lining cups, each having a center, secured to the carrier disk and filled with brake lining material, wherein the brake lining material is secured to the carrier disk through the lining cups with an attachment fastener, forming a brake lining assembly, is improved by the attachment fastener being offset from the lining cup center.

13 Claims, 5 Drawing Sheets

BRAKE LINING CUP ATTACHMENT METHOD FOR REDUCED WEAR

This application claims the benefit of U.S. Provisional Application No. 60/825,273 filed Sep. 11, 2006.

BACKGROUND

The present invention is in the field of braking systems. More specifically this invention relates to the brake linings for use in a braking disk.

Modern steel brake designs rely on the friction generated between solid steel and sintered metal wear surfaces. The steel surface may take the form of a full annular disk, or may be segmented and connected, with or without a substructure, to form a full annular disk. The sintered metal components are lower in strength, and may be applied directly to an annular disk, or segmented and mounted to an annular disk substructure or lining carrier.

Segmented linings contain a number of consumable lining containers or cups which are fastened to a reusable carrier. The cups are typically stamped from steel sheet metal and are formed to hold or contain the lining material. The cups are usually plated to protect against corrosion, and to aid in developing a metallurgical bond with the lining material. Powdered metal is then added to the lining cup through the conventional process of densification and sintering.

Brake wear is effected by, among other things, the ratio of energy absorbed per unit of lining surface area (lining loading). Due to the porosity of powdered metal material, linings also act as good insulators. As a result of this, energy, in the form of heat, is slow to transfer through the lining material. Large thermal gradients therefore develop through the thickness of the cup. Due to differential thermal expansion, the lining cup deforms such that the area at the wear interface is reduced. This results in a reduction in "effective" lining area, high localized lining loadings and subsequently increased wear.

A method of attachment of the lining cups and material is desired which would increase the "effective" lining wear area, even after sustained use.

SUMMARY

A brake lining assembly having an annular carrier disk, and a plurality of segmented brake lining cups, each having a center, secured to the carrier disk and filled with brake lining material, wherein the brake lining material is secured to the carrier disk through the lining cups with an attachment fastener, forming a brake lining assembly, wherein the improvement comprises the attachment fastener being offset from the lining cup center.

DETAILED DESCRIPTION

Figure 1:
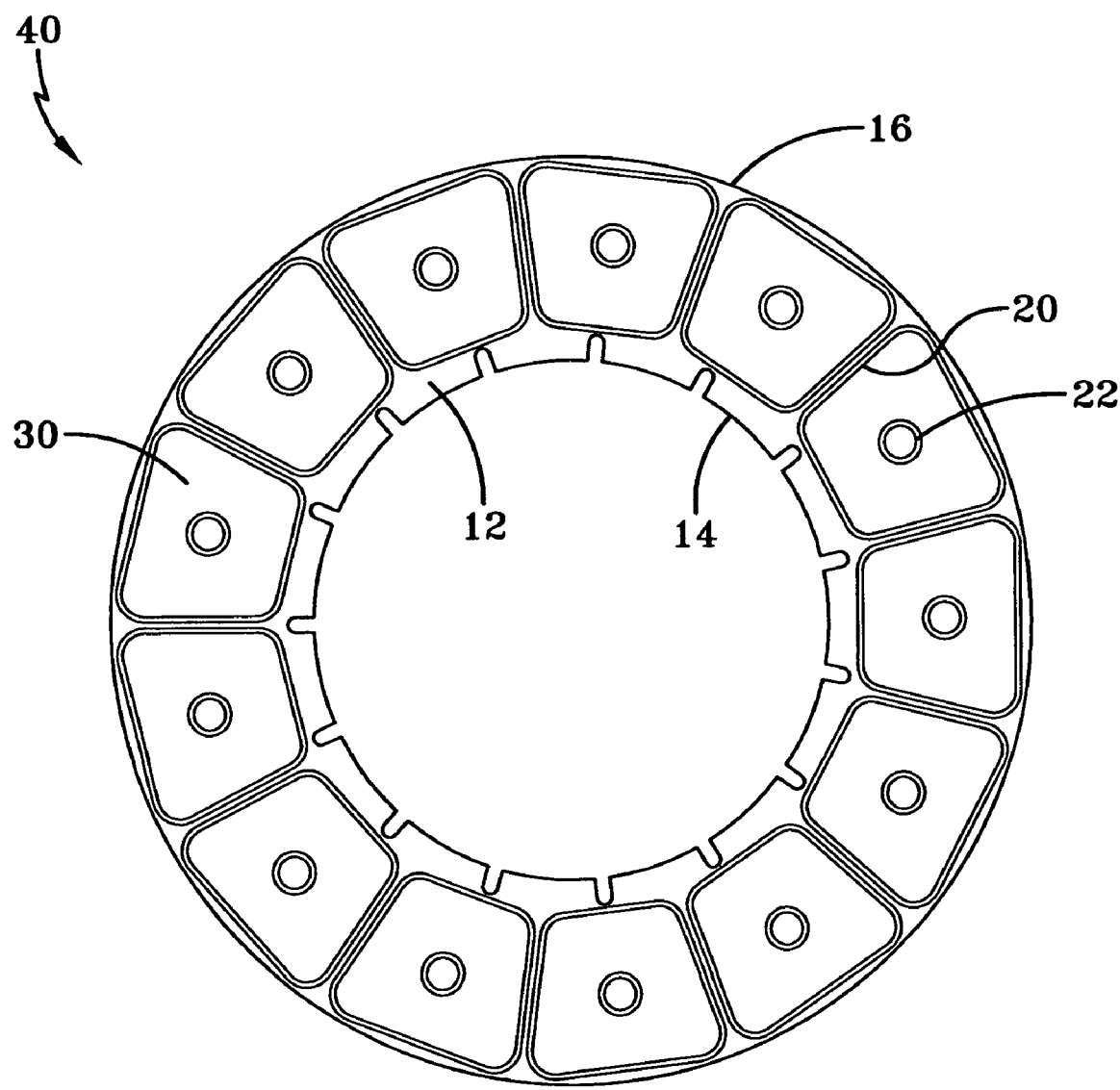
FIG. 1 is an end view of a brake lining assembly according to an aspect of the invention.
Figure 2:
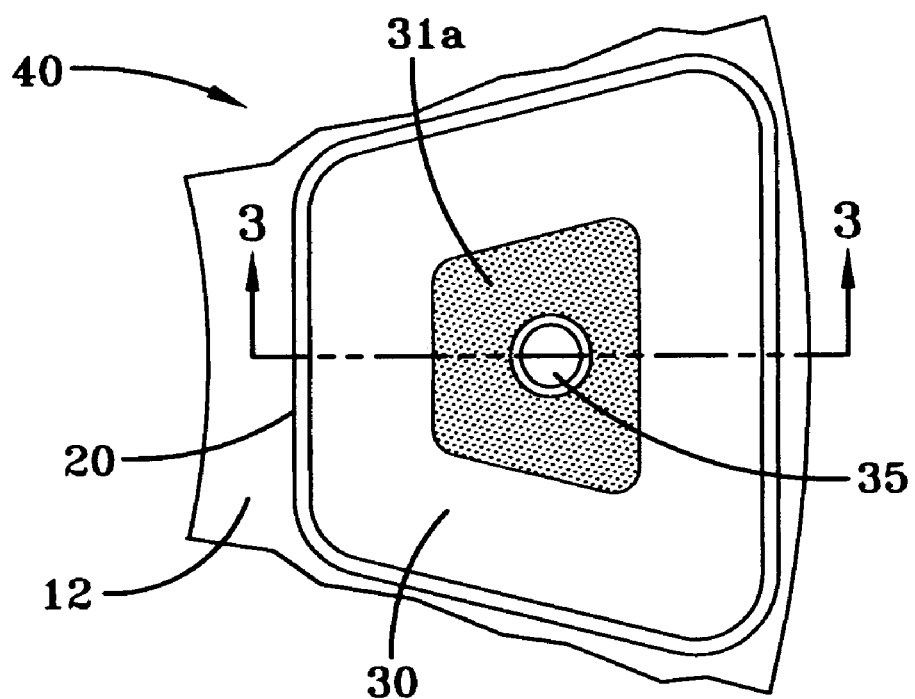
FIG. 2 is a top view of a prior art brake lining assembly.
Figure 3:
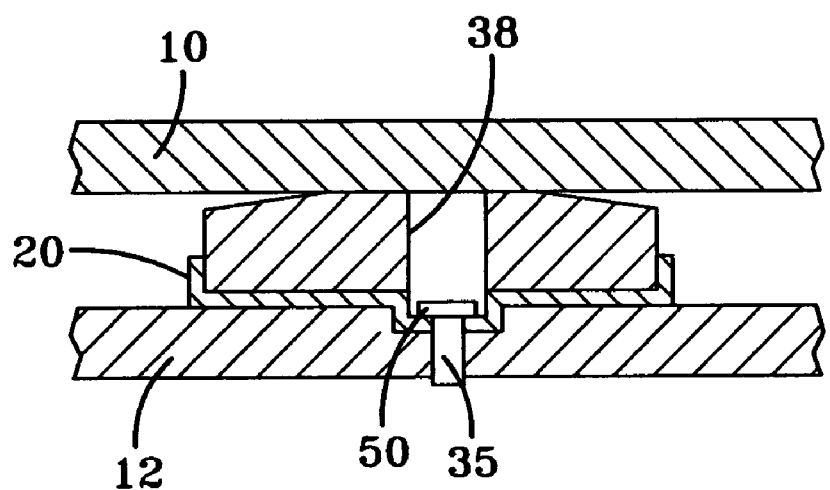
FIG. 3 is the cross section view of FIG. 2.
Figure 4:
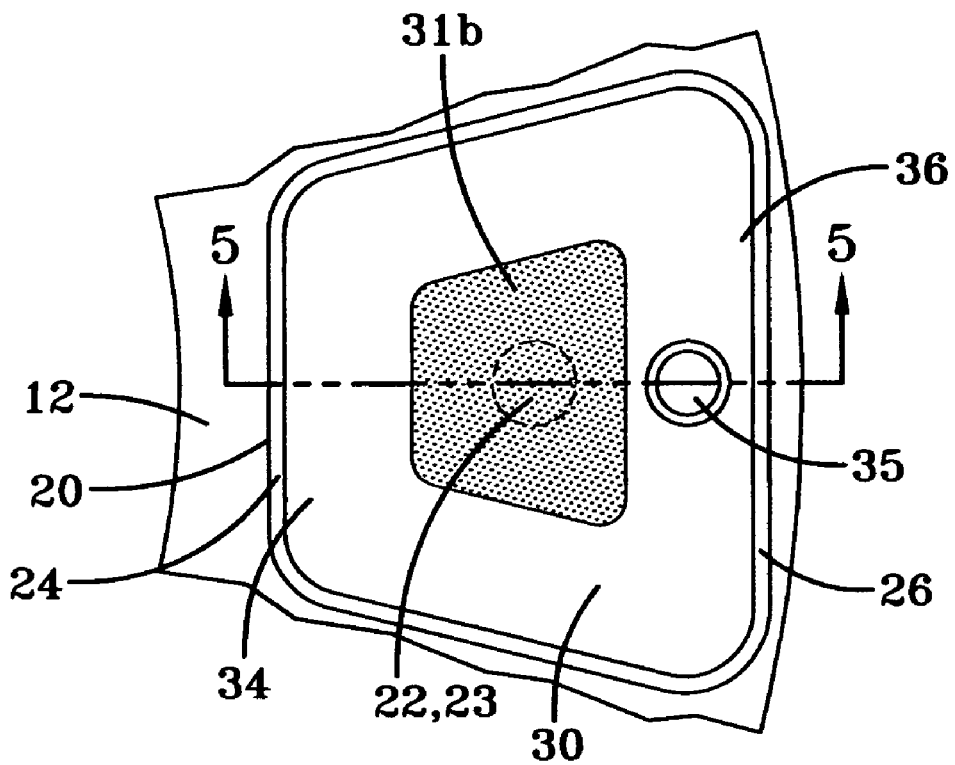
FIG. 4 is a top view of a brake lining assembly according to an aspect of the invention.
Figure 5:
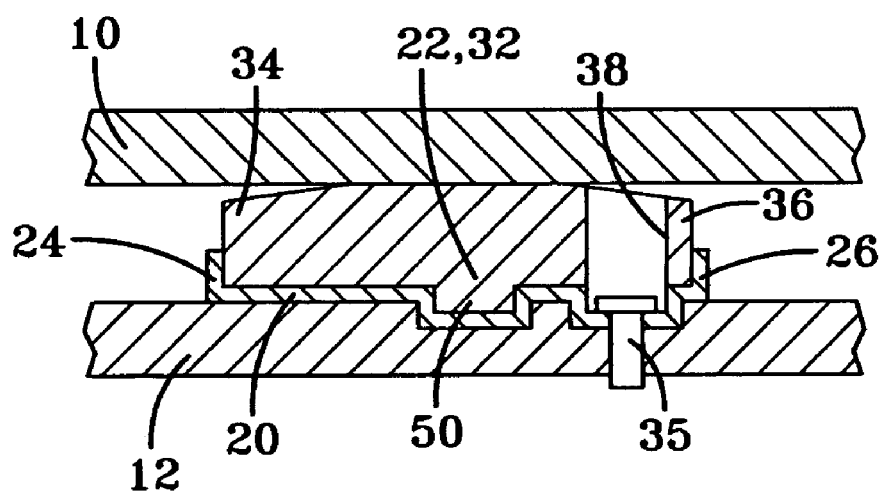
FIG. 5 is the cross section view of FIG. 4, additionally showing the brake disk in relation to the brake lining assembly.
Figure 6:
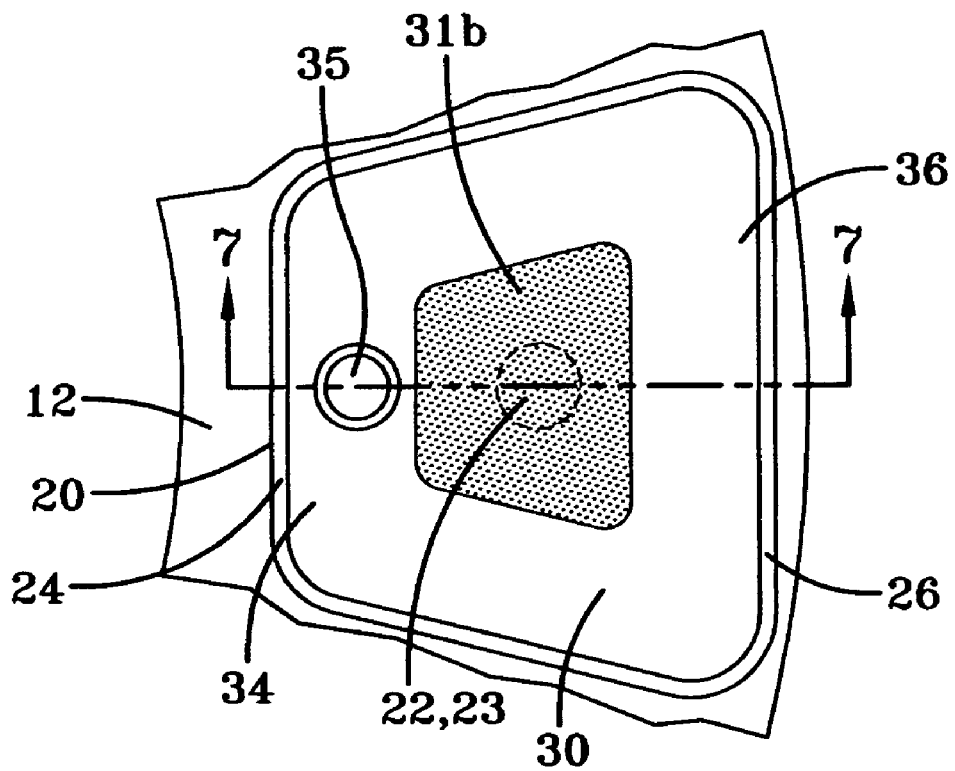
FIG. 6 is a top view of a brake lining assembly according to an aspect of the invention.
Figure 7:
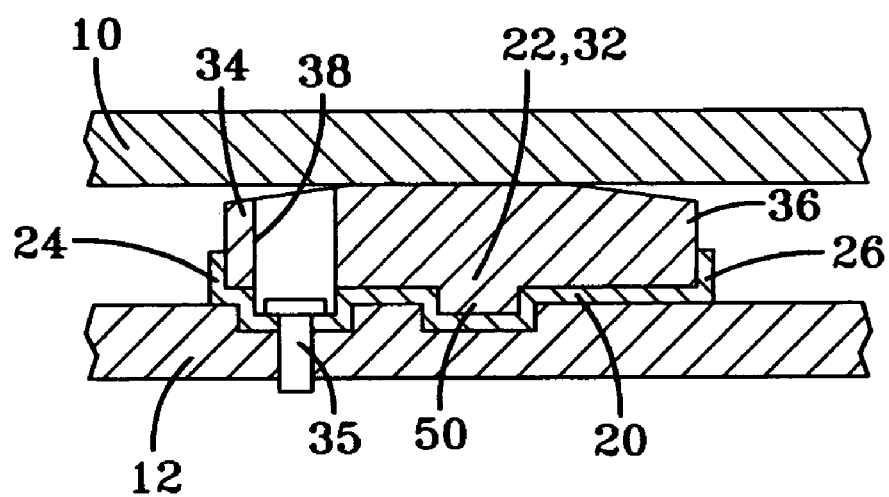
FIG. 7 is the cross section view of FIG. 6, additionally showing the brake disk in relation to the brake lining assembly.
Figure 8:
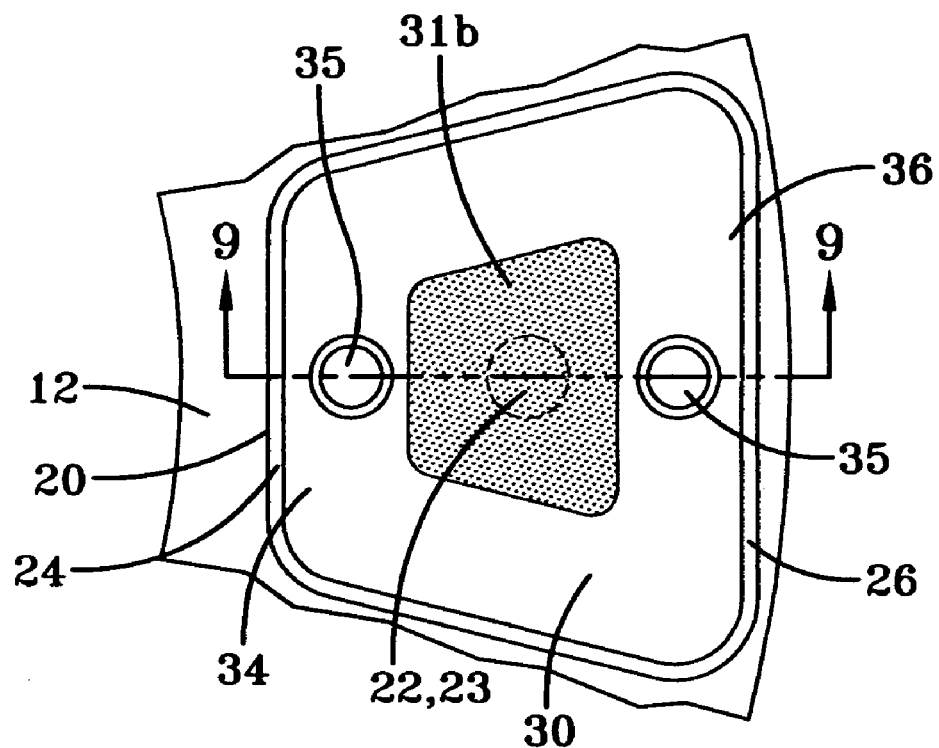
FIG. 8 is a top view of a brake lining assembly according to an aspect of the invention.
Figure 9:
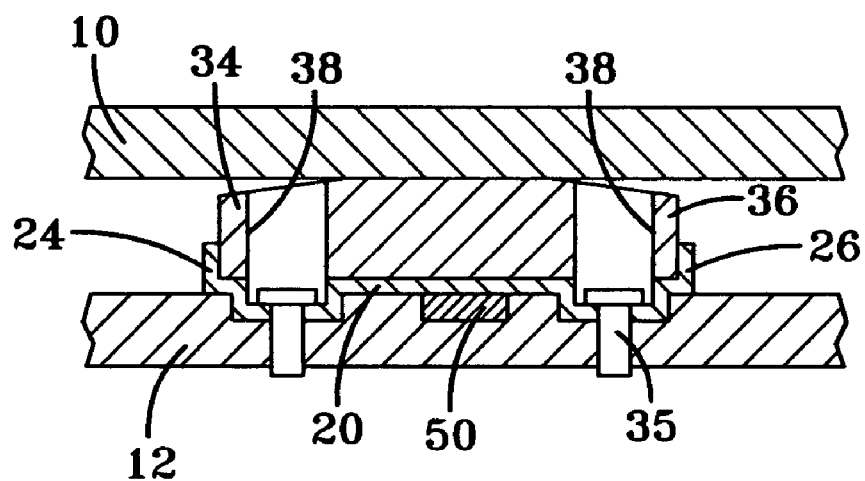
FIG. 9 is the cross section view of FIG. 8, additionally showing the brake disk in relation to the brake lining assembly.

Various aspects of the invention are presented in FIGS. 1-6 which are not drawn to scale and in which like components are numbered alike. Referring now to FIGS. 1-3, according to an aspect of the invention, a brake disk 10 is engaged by a brake lining assembly 40. An annular carrier disk 12 has a plurality of segmented brake lining cups 20 secured to the carrier disk 12. These lining cups 20 each have a center 22, and are filled with brake lining material 30. The brake lining material 30 is secured to the carrier disk 12 through the lining cups 20 with an attachment fastener 35, forming a brake lining assembly 40. The brake lining assembly 40 has a wear surface. This is a fairly standard disk brake construction.

In the past, the lining material 30 was attached through the center of the lining cup 22. Thus when the thermal differential discussed above caused deformation, this deformation left only a wear area 31a in the center around the attachment point. This is shown in FIGS. 2 and 3. To overcome this problem, according to an aspect of the invention, the attachment fastener 35 has been offset from the lining cup center 22. This results in an increase in wear area 31b, lower localized lining loading and subsequently reduced wear. This is shown in FIGS. 4 thru 9. FIGS. 4 thru 9 show several configurations for the offset of the attachment fastener 35, however the invention is not limited to these particular offsets. The fasteners may be offset diagonally, tangentially, or various other ways which leave the wear area 31b.

According to an aspect of the invention, the annular carrier disk 12 has an inner radius 14 and an outer radius 16. The lining cups 20 have a corresponding inner edge 24, and a corresponding outer edge 26, and the attachment fastener 35 is located more proximate to the lining cup outer edge 26 than to the lining cup center 22.

According to another aspect of the invention, the attachment fastener 35 is located more proximate to the lining cup inner edge 24 than to the lining cup center 22.

In a further embodiment of the invention, two attachment fasteners 35 are used for attachment of the lining material 30 to the carrier 12 through the lining cup 20, wherein the attachment fasteners 35 are located one each on opposing sides of the lining cup center 22. In a further embodiment, one attachment fastener 35 is located more proximate to the lining cup inner edge 24 than to the lining cup center 22, and the other attachment fastener 35 is located more proximate to the lining cup outer edge 26 than to the lining cup center 22.

A torque button is frequently used in a brake disk assembly as described. This is a portion of the lining cup, or something attached to the lining cup which extends into a corresponding indentation in the carrier. Whereas the attachment fasteners 35 are intended to provide axially connection of the cups to the carrier, the torque button is intended to transfer the shear loads created by the relative disk rotation. In the prior art, this torque button was at the same location as the attachment fastener 35, in the lining cup center 22. According to an aspect of the invention, the lining cup 20 is formed with a torque button 50 in the lining cup center 22, wherein this torque button 50 extends into the carrier disk 12. In a further embodiment of the invention, the torque button 50 is fabricated and attached to the lining cup center 22 (see FIG. 9).

According to an aspect of the invention, a method of attachment of a brake lining cup 20 and brake lining material 30 to an annular carrier disk 12, comprises the steps: forming a lining cup 20 having a center 22; forming lining material 30 to fit into the lining cup 20, and thus having a corresponding lining material center 32, wherein the lining material 30 has at least one attachment hole 38 offset from the lining material center 32; and attaching the lining material 30 to the carrier 12 through the lining cup 20 with an attachment fastener 35 through the attachment hole 38.

According to a further aspect of the invention, the annular carrier disk 12 has an inner radius 14 and an outer radius 16, and the lining material 30 has a corresponding inner edge 34, and a corresponding outer edge 36, wherein the attachment hole 38 is located more proximate to the lining material outer edge 36 than to the lining material center 32.

According to a further aspect of the invention, the attachment hole 38 is located more proximate to the lining material inner edge 34 than to the lining material center 32.

In a further embodiment of the invention, two attachment fasteners 35 are used for attachment of the lining material 30 to the carrier 12 through the lining cup 20, wherein the attachment holes 38 are located one each on opposing sides of the lining cup material center 32. In a further embodiment, one attachment hole 38 is located more proximate to the lining cup material inner edge 34 than to the lining cup material center 32, and the other attachment hole 38 is located more proximate to the lining cup material outer edge 36 than to the lining cup material center 32.

I claim:

1. A brake lining assembly having an annular carrier disk, and a plurality of segmented brake lining cups, each having a center, secured to said carrier disk and filled with brake lining material, forming a brake lining assembly, the improvement comprising:

wherein said brake lining material is secured to said carrier disk with an attachment fastener through said lining material and said lining cups, wherein said attachment fastener is offset from said lining cup center, and wherein said lining cup is formed with a torque button in the lining cup. wherein this torque button is offset from said attachment fasteners, and wherein said torque button extends into said carrier disk.

2. The brake lining assembly of claim 1 wherein said annular carrier disk has an inner radius and an outer radius, and wherein said lining cups have a corresponding inner edge, and a corresponding outer edge, wherein said attachment fastener is located more proximate to the lining cup outer edge than to the lining cup center.

3. The brake lining assembly of claim 1 wherein said annular carrier disk has an inner radius and an outer radius, and wherein said lining cups have a corresponding inner edge, and a corresponding outer edge, wherein said attachment fastener is located more proximate to the lining cup inner edge than to the lining cup center.

4. The brake lining assembly of claim 1 wherein said annular carrier disk has an inner radius and an outer radius, and wherein said lining cups have a corresponding inner edge, and a corresponding outer edge, wherein two attachment fasteners are used for attachment of the lining material to the carrier through the lining cup, wherein said attachment fasteners are located one each on opposing sides of the lining cup center.

5. The brake lining assembly of claim 1 wherein said annular carrier disk has an inner radius and an outer radius, and wherein said lining cups have a corresponding inner edge, and a corresponding outer edge, wherein two attachment fasteners are used for attachment of the lining material to the carrier through each lining cup, wherein one said attachment fastener is located more proximate to the lining cup inner edge than to the lining cup center, and the other said attachment fastener is located more proximate to the lining cup outer edge than to the lining cup center.

6. The brake lining assembly of claim 1 wherein said lining cup is formed with a torque button in the lining cup center, wherein this torque button extends into said carrier disk.

7. A method of attachment of a brake lining cup and brake lining material to an annular carrier disk, comprising the steps:

forming a lining cup having a center;

forming lining material to fit into said lining cup, and thus having a corresponding lining material center, wherein said lining material has at least one attachment hole offset from said lining material center; and attaching said lining material to said carrier through said lining cup with an attachment fastener through said attachment hole wherein said lining cup is formed with a torque button offset from said attachment fastener, wherein this torque button extends into said carrier disk.

8. The attachment method of claim 7 wherein said lining cup is formed with a torque button in the lining cup center, wherein this torque button extends into said carrier disk.

9. The attachment method of claim 7 wherein a torque button is fabricated and attached to the lining cup, wherein this torque button extends into said carrier disk.

10. The attachment method of claim 7 wherein said annular carrier disk has an inner radius and an outer radius, and wherein said lining cup, and lining material have a corresponding inner edge, and a corresponding outer edge, wherein said attachment hole is located more proximate to the lining material outer edge than to the lining material center.

11. The attachment method of claim 7 wherein said annular carrier disk has an inner radius and an outer radius, and wherein said lining cup, and lining material have a corresponding inner edge, and a corresponding outer edge, wherein said attachment hole is located more proximate to the lining material inner edge than to the lining material center.

12. The attachment method of claim 7 wherein said annular carrier disk has an inner radius and an outer radius, and wherein said lining cup, and lining material have a corresponding inner edge, and a corresponding outer edge, wherein two attachment fasteners are used for attachment of the lining material to the carrier through the lining cup, wherein said attachment holes are located one each on opposing sides of the lining material center.

13. The attachment method of claim 7 wherein said annular carrier disk has an inner radius and an outer radius, and wherein said lining cup, and lining material have a corresponding inner edge, and a corresponding outer edge, wherein two attachment fasteners are used for attachment of the lining material to the carrier through the lining cup, wherein one said attachment hole is located more proximate to the lining material inner edge than to the lining material center, and the other said attachment hole is located more proximate to the lining material outer edge than to the lining material center.

* * * * *